United States Patent
Sun et al.

(10) Patent No.: US 12,112,772 B2
(45) Date of Patent: Oct. 8, 2024

(54) METHOD AND APPARATUS FOR VIDEO PRODUCTION, DEVICE AND STORAGE MEDIUM

(71) Applicant: BEIJING BYTEDANCE NETWORK TECHNOLOGY CO., LTD., Beijing (CN)

(72) Inventors: Lei Sun, Beijing (CN); Hai Ning, Beijing (CN); Song Feng, Beijing (CN); Yaxuan Du, Beijing (CN); Weijie Liu, Beijing (CN); Yichi Wang, Beijing (CN); Hao Wu, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 3 days.

(21) Appl. No.: 17/439,354

(22) PCT Filed: Jul. 2, 2021

(86) PCT No.: PCT/CN2021/104359
§ 371 (c)(1),
(2) Date: Sep. 14, 2021

(87) PCT Pub. No.: WO2022/042035
PCT Pub. Date: Mar. 3, 2022

(65) Prior Publication Data
US 2022/0310125 A1    Sep. 29, 2022

(30) Foreign Application Priority Data

Aug. 24, 2020   (CN) .......................... 202010859130.6

(51) Int. Cl.
*G11B 27/031*     (2006.01)
*G06T 13/00*      (2011.01)
*G06F 3/0482*     (2013.01)

(52) U.S. Cl.
CPC ............ *G11B 27/031* (2013.01); *G06T 13/00* (2013.01); *G06F 3/0482* (2013.01); *G06T 2200/24* (2013.01)

(58) Field of Classification Search
CPC ... G11B 27/031; G06T 13/00; G06T 2200/24; G06F 3/0482
(Continued)

(56) References Cited

U.S. PATENT DOCUMENTS

| | | | |
|---|---|---|---|
| 10,269,387 B2 | 4/2019 | Richardson et al. | |
| 2010/0179674 A1* | 7/2010 | Willard | G10H 1/0025 |
| | | | 715/771 |

FOREIGN PATENT DOCUMENTS

| | | |
|---|---|---|
| CN | 103793446 A | 5/2014 |
| CN | 103885962 A | 6/2014 |

(Continued)

OTHER PUBLICATIONS

English Translation of Chinese Publication 110213504 (Year: 2019).*
(Continued)

*Primary Examiner* — Loi H Tran (57) ABSTRACT

A method and an apparatus for video production, a device and a storage medium are provided by the embodiment of the present disclosure, where information of a song list and a target song in the song list are acquired in response to a first instruction of a user, video materials are generated according to the information of the song list and a video is generated according to the video materials and a preset animation effect, and the target song and the video are merged to obtain a video file. In the embodiment of the present disclosure, by making the song list into a video containing more elements, better displaying of the information of the song list is realized, thus rendering it attractive for a user to click and play in a more effective manner, thereby (Continued)

effectively improving the click rate and playback amount of the song list.

20 Claims, 5 Drawing Sheets

(58) Field of Classification Search
USPC .......................................................... 386/280
See application file for complete search history.

(56) References Cited

FOREIGN PATENT DOCUMENTS

| | | | |
|---|---|---|---|
| CN | 104065888 A | 9/2014 |
| CN | 104580411 A | 4/2015 |
| CN | 104967900 A | 10/2015 |
| CN | 105959725 A | 9/2016 |
| CN | 106598996 A | 4/2017 |
| CN | 107943964 A | 4/2018 |
| CN | 109144346 A | 1/2019 |
| CN | 109325143 A | 2/2019 |
| CN | 109327608 A | 2/2019 |
| CN | 109658483 A | 4/2019 |
| CN | 110209844 A | 9/2019 |
| CN | 110213504 A | 9/2019 |
| CN | 110336960 A | 10/2019 |
| CN | 110798737 A | 2/2020 |
| CN | 111031391 A | 4/2020 |
| CN | 111274415 A | 6/2020 |
| CN | 111970571 A | 11/2020 |

OTHER PUBLICATIONS

English Translation of Chinese Publication 111031391 (Year: 2020).*
English Translation of Chinese Publication 103885962 (Year: 2014).*
English Translation of Chinese Publication CN 111415396 (Year: 2020).*
English Translation of Chinese Publication CN 110807126 (Year: 2020).*
Chinese Patent Application No. 202010859130.6, First Office Action mailed Jun. 18, 2021, 7 pages.
International Application No. PCT/CN2021/104359, International Search Report mailed Sep. 28, 2021, 4 pages.
Extended EP Search Report issued Sep. 6, 2023 in EP Appl. No. 21859875.3 (7 pages).
Office Action issued Oct. 27, 2023 in ID Appl. No. P00202108079, English translation (6 pages).

* cited by examiner

METHOD AND APPARATUS FOR VIDEO PRODUCTION, DEVICE AND STORAGE MEDIUM

CROSS-REFERENCE TO RELATED APPLICATION

This application is a National Stage of International Application No. PCT/CN2021/104359, filed on Jul. 2, 2021, which claims priority of Chinese Patent Application No. 202010859130.6, filed on Aug. 24, 2020. The disclosures of the aforementioned applications are hereby incorporated by reference in their entireties.

TECHNICAL FIELD

The present disclosure relates to the field of computer and network communication technologies and, in particular, to a method and an apparatus for video production, a device and a storage medium.

BACKGROUND

With a rapid development of Internet technologies, functions of mobile phones, tablet computers and other terminals are becoming increasingly rich, which have thereby gradually become indispensable tools in people's work and life. Entertainment applications such as a music type application and the like may be installed in a terminal, a user may browse information in these entertainment applications and share the browsed information to other users. For example, the user can browse a song list in the music type application and share the song list with other users.

In prior art, the song list in the music type application usually displays information such as pictures (e.g., a cover of the song list and the like) and a song name list only, with a monotonous display form and a poor displaying effect, hence, content of the song list cannot be displayed well, and a click rate and playback amount of the song list cannot be effectively improved. Particularly, when the song list is shared, only a link including the information such as the pictures (e.g., the cover of the song list and the like) and the song name list is shared, thus leading to a poor effect of song list sharing.

SUMMARY

Embodiments of the present disclosure provide a method and an apparatus for video production, a device and a storage medium, to realize better displaying of content of a song list, improve a displaying effect of the content of the song list, and effectively improve the click rate and playback amount of the song list.

In a first aspect, an embodiment of the present disclosure provides a method for video production, including:
  in response to a first instruction of a user, acquiring information of a song list and a target song in the song list;
  generating video materials according to the information of the song list, and generating a video according to the video materials and a preset animation effect; and
  merging the target song and the video to obtain a video file.

In a second aspect, an embodiment of the present disclosure provides an apparatus for video production, including:

an acquiring module, configured to acquire information of a song list and a target song in the song list, in response to a first instruction of a user;
a generating module, configured to generate video materials according to the information of the song list, and generate a video according to the video materials and a preset animation effect; and
a merging module, configured to merge the target song and the video to obtain a video file.

In a third aspect, an embodiment of the present disclosure provides an electronic device, including at least one processor and a memory;
  the memory stores a computer executable instruction;
  the at least one processor executes a computer executable instruction stored in the memory, and causes the at least one processor to execute the method in the above-mentioned first aspect.

In a fourth aspect, an embodiment of the present disclosure provides a computer readable storage medium having a computer executable instruction stored thereon, when a processor executes the computer executable instruction, the method in the above-mentioned first aspect is implemented.

In a fifth aspect, an embodiment of the present disclosure provides a computer program product, the computer program product includes a computer program, the computer program is stored in a computer readable storage medium, at least one processor of an electronic device may read the computer program from the computer readable storage medium, when the processor executes the computer program, the method in the above-mentioned first aspect is implemented.

In a sixth aspect, an embodiment of the present disclosure provides a computer program, the computer program is stored in a computer readable storage medium, at least one processor of a device may read the computer program from the computer readable storage medium, and when the processor executes the computer program, the method in the above-mentioned first aspect is implemented.

According to the method and apparatus for video production, device and storage medium provided by the embodiments of the present disclosure, information of a song list and a target song in the song list are acquired in response to a first instruction of a user, video materials are generated according to the information of the song list and a video is generated according to the video materials and a preset animation effect, and the target song and the video are merged to obtain a video file. In the embodiments of the present disclosure, by making the song list into a video containing more elements, better displaying of the information of the song list is realized, the displaying and sharing effect of the song list is improved, thus rendering it attractive for a user to click and play in a more effective manner, thereby effectively improving the click rate and playback amount of the song list.

BRIEF DESCRIPTION OF DRAWINGS

In order to explain the embodiments of the present disclosure or the technical solutions in the prior art more clearly, the drawings needed to be used in the embodiments or the description of the prior art will be introduce briefly in the following. Obviously, the drawings in the following description are some embodiments of the present disclosure. For those skilled in the art, other drawings can be obtained from these drawings without paying creative labor.

DESCRIPTION OF EMBODIMENTS

To make the purposes, technical solutions and advantages of embodiments of the present disclosure more clearly, the technical solutions in the embodiments of the present disclosure are clearly and completely described in the following with reference to the accompanying drawings of the embodiments of the present disclosure. Obviously, the described embodiments are part of embodiments of the disclosure, not all embodiments. Based on the embodiments of the present disclosure, all other embodiments obtained by those skilled in the art without paying creative effort are all within the protection scope of the present disclosure.

In prior art, the song list in the music type applications usually displays information such as pictures (e.g., a cover of the song list and the like) and a song name list only, with a monotonous display form and a poor displaying effect, hence, content of the song list cannot be displayed well, and a click rate and playback amount of the song list cannot be effectively improved. Particularly, when the song list is shared, only a link including the information such as the pictures (e.g., the cover of the song list and the like) and the song name list is shared, thus leading to a poor effect of song list sharing.

In order to solve the above technical problems, in the embodiment of the present disclosure, considering that a video has a good displaying effect and may contain more elements, which would effectively get more attractions in terms of clicking and playing, and exhibit better displaying and sharing potential, therefore, a song list may be displayed and shared by making the song list into a video, so as to improve the displaying and sharing effect of the song list, and improve the click rate and playback amount of the song list. In order to achieve that the song list is made into the video, information of the song list and at least one song in the song list may be acquired first, a video is generated according to the information of the song list and a preset animation effect, and the acquired song is used as background music and merged with the video to obtain a video file, and then the song list may be output in a form of video file, such as being stored or shared on a designated social platform.

Figure 1:
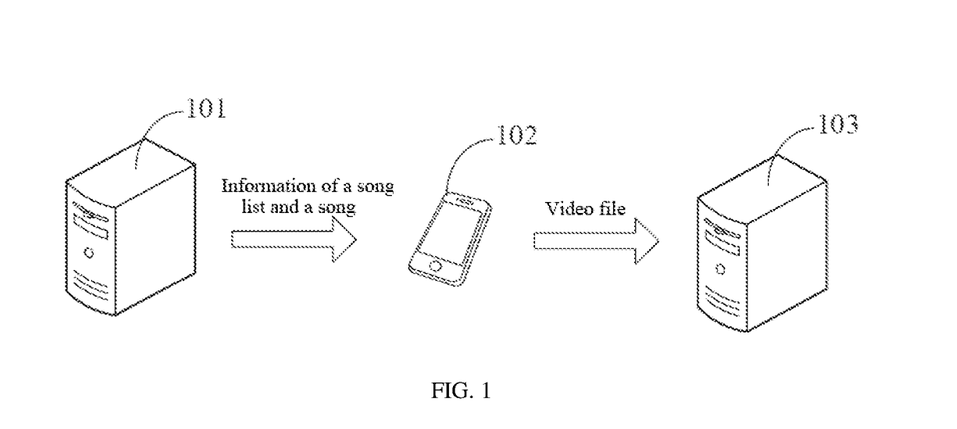
FIG. 1 is an example diagram of a communication system of a method for video production according to an embodiment of the present disclosure.

A method for video production provided by the embodiment of the present disclosure may be applied to a communication system as shown in FIG. 1, the communication system includes a terminal 101, a server 102, a social platform server 103, where a user may trigger a first instruction of video production on the terminal 101, after the terminal 101 receives the first instruction of the user, the terminal 101 may acquire information of a song list and at least one song in the song list from the server 102, generate a video according to the information of the song list and a preset animation effect, and use the acquired song as background music and merge it with the video into a video file. Further, it is possible to send the video file to the social platform server 103 for sharing on a social platform, or store the video file locally in the terminal 101, or upload the video file to another server for storage.

The technical solutions of the present disclosure and how to solve the above technical problem through the technical solutions of the present disclosure are illustrated in detail below with specific embodiments. The following specific embodiments may be combined with each other, and the same or similar concepts or processes may not be repeated in some embodiments. Embodiments of the present disclosure will be described below with reference to the accompanying drawings.

Figure 2:
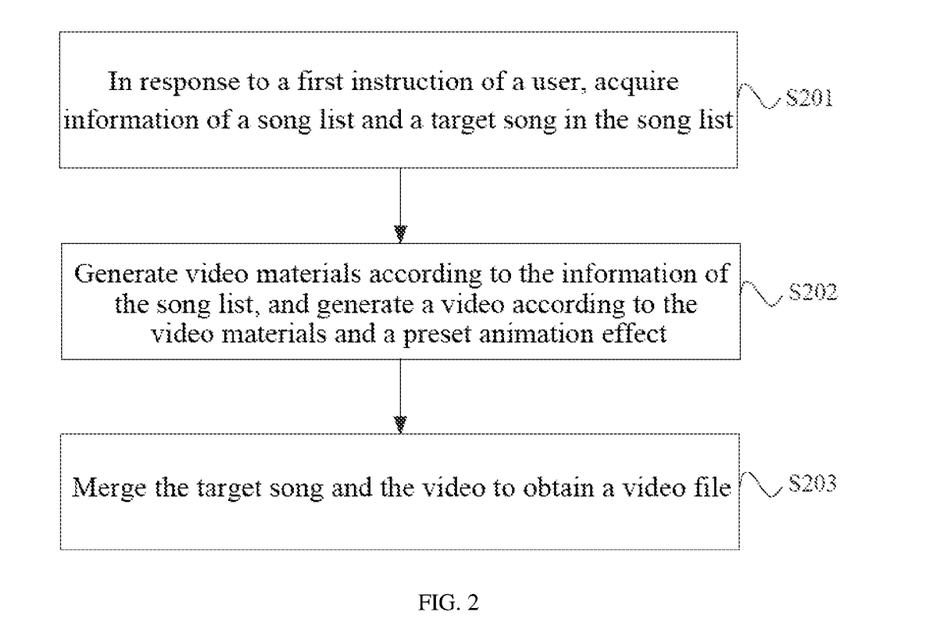
FIG. 2 is a schematic flowchart of a method for video production according to an embodiment of the present disclosure.

Refer to FIG. 2, FIG. 2 is a schematic flowchart 1 of a method for video production according to an embodiment of the present disclosure. The method of the embodiment may be applied to a terminal, which is not limited to a smart phone, a tablet, a laptop, a wearable device, etc., specific steps of the method for video production include:

S201: in response to a first instruction of a user, acquire information of a song list and a target song in the song list.

In the embodiment, when a user needs to display or share a song list, the user may trigger, on the terminal, a first instruction of producing the song list into a video. For example, the user may click a button for video production or a sharing button in a displaying interface of the song list, or input the first instruction to the terminal by way of voices, gestures, etc.

After the terminal receives the first instruction of the user, the terminal may acquire information of the song list and a target song in the song list. Where the information of the song list and song are pre-stored on a server, the information of the song list and the song may be uploaded to the server in advance by an author of the song list, a record company, an artist, etc., which include but not limited to at least one of the following items: a cover image of the song list, a name of the song list, a song name list, information on the author of the song list, information on a sharer and information on the artist of the song.

In addition, use the target song in the song list as background music of a video file, which may be any one or more songs in the song list, in an implementation, the target song may be a first song in the song list, or a song with the highest popularity or the highest playback amount in the song list; of course, the target song may also include several songs that can be merged into a piece of audio through audio editing and used as the background music of the video file in a later stage.

In an implementation, it is possible to determine whether the target song is copyrighted; if the target song is not copyrighted, then re-acquire at least one copyrighted song from the song list as the target song; or, close or cancel the target song of the video file. In the embodiment, in a case of considering the copyright problem, it is possible to determine whether the target song is copyrighted first. In an implementation, a downloaded target song may be any copyrighted song in the song list. For example, if the first song is the target song by default, when the first song is not copyrighted, download a following song which is copyrighted as the target song. Or, if the target song is not copyrighted, turn off the background music in the merged video file, or not add the background music to the video file in step S203 below.

S202: generate video materials according to the information of the song list, and generate a video according to the video materials and a preset animation effect.

In the embodiment, the information of the song list may include a text or a picture. It is possible to perform processing such as typesetting the text and cutting the picture, so as to obtain corresponding video materials. In an implementation, since the video is composed of frames of images, therefore, convert each video material into a form of pictures.

After the video materials are obtained, generate the video according to the video materials and the preset animation effect. The preset animation effect may be a fixed preset animation effect or an animation effect preset by a user, which may specifically include action information of respective video materials, such as a displaying manner and a disappearing manner, a sequence and time points for displaying and disappearing, as well as some attribute information of the respective video materials, such as a size, a position, a hierarchical relationship among the respective video materials and the like during the displaying thereof. More specifically, the preset animation effect may include but not limited to: displaying and disappearing of a text of the song list, scaling of a cover image of the song list, appearance animation of a name of the song list and an author of the song list, a transition effect, the number of transitions, and displaying of details of the song list when entering a song list details page after the transition, a way of finally displaying a logo of a software, as well as a sequence and time points for the above actions, etc. It is possible to generate, according to the video materials and the preset animation effect, video frames frame by frame in turn, display a change process of the video materials in adjacent video frames, and merge the video frames into a video according to a preset video frame rate.

S203: merge the target song and the video to obtain a video file.

In the embodiment, merge the target song and the video and add a piece of background music to the video, so that one or more songs in the song list may be enjoyed while the video file is played. Through the background music, a style of songs in the song list may be quickly understood, whether it meets your own preference, etc. In an implementation, it is possible to intercept a segment of a song from the target song, or merge multiple song segments as the background music.

On the basis of the above embodiment, in an implementation, after the video file is obtained, it is also possible to share the video file to a target platform, where the target platform may include but not limited to Weibo, WeChat Moments, etc., or to share the video file in a chat software. In an implementation, the user may designate the target platform in the first instruction or select the target platform after the video file is obtained. In another embodiment, it is also possible to store the video file, such as store the video file locally or upload the video file to a cloud database.

In the method for video production provided by the embodiment of the present disclosure, information of a song list and a target song in the song list are acquired in response to a first instruction of a user, video materials are generated according to the information of the song list and a video is generated according to the video materials and a preset animation effect, and the target song and the video are merged to obtain a video file. In the embodiment of the present disclosure, by making the song list into a video containing more elements, better displaying of the information of the song list is realized, the displaying and sharing effect of the song list is improved, thus rendering it attractive for a user to click and play in a more effective manner, thereby effectively improving the click rate and playback amount of the song list.

Figure 3:
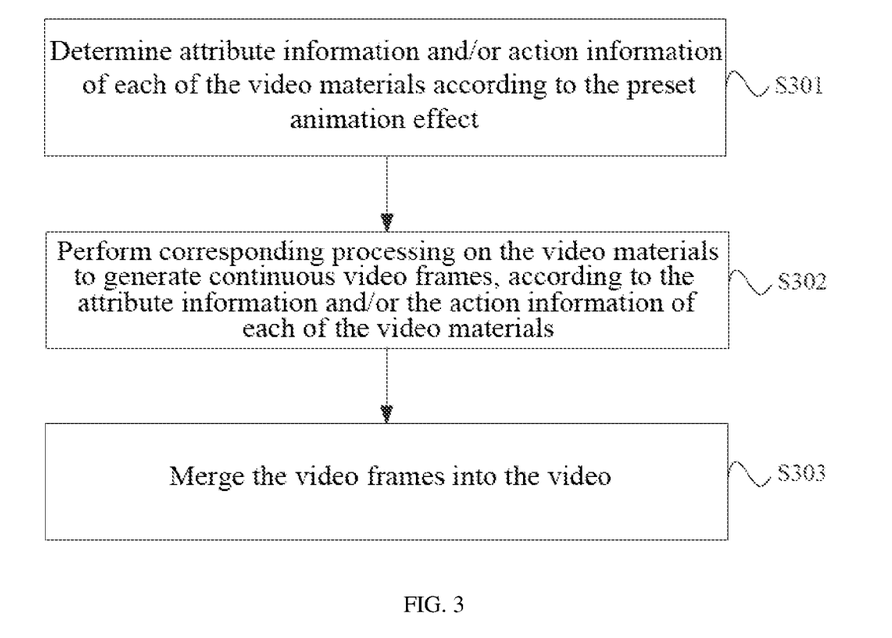
FIG. 3 is a schematic flowchart of a method for video production according to another embodiment of the present disclosure.

In an embodiment of the present disclosure, as shown in FIG. 3, the generating video materials according to the information of the song list, and generating a video according to the video materials and a preset animation effect described in S202 may specifically include:

S301: determine attribute information and/or action information of each of the video materials according to the preset animation effect.

In the embodiment, since the information of the song list may include a text or a picture. In an implementation, it is possible to perform processing such as typesetting the text and cutting the picture first, since the video is composed of frames of images, therefore, convert each video material into a form of pictures, so as to obtain pictures corresponding to the information of the song list as the video materials.

In the embodiment, in the preset animation effect, it is possible to set some attribute information and/or action information for each video material, where the attribute information of the video material may include but not limited to a size and/or position information of the video material, and the action information of the video material may include but not limited to time information and/or an action type of an action performed by the video material. Of course, the preset animation effect may not be limited to the above examples and will not be repeated herein.

S302: perform corresponding processing on the video materials to generate continuous video frames, according to the attribute information and/or the action information of each of the video materials.

In the embodiment, determine, according to the attribute information and/or the action information of each of the video materials (for example, the size and/or position information, the time information and/or the action type of the action performed), a rule of changes over time for each video material, and merge video materials at the same time point according to their corresponding sizes and position information at this time point, in accordance with the rule of changes over time, so as to generate a video frame at this time point.

For example, for a scaling animation effect of the cover image of the song list, determine, according to a time point when the cover image of the song list appears, an initial size, an initial position, a scaling scale, a scaling speed, a scaling center point in a scaling process, etc., video frames in which the cover image of the song list appears, as well as a size, a position and a hierarchical relationship with other materials of the cover image of the song list in each frame of these video frames. When these video frames are played continuously, the cover image of the song list can show a required scaling effect. Similarly, perform the above processing on other video materials, so as to obtain all continuous video frames.

S303: merge the video frames into the video.

In the embodiment, sequentially merge the video frames according to a predetermined video frame rate to obtain a complete video, so that a process in which the video materials change in accordance with the preset animation effect can be shown.

It should be noted that, the above process is completed by the terminal. Since operating systems of different terminals may be different, therefore, corresponding tools of the operating systems will implement the above process in corresponding manners under different operating systems.

In an embodiment, for the iOS operating system of Apple incorporation, the method for video production may be implemented through a system API provided by iOS, and the implementation process is as follows:

S311: acquire information of a song list through a network interface and download an audio file of a target song in the song list; use a picture generation control and a text typesetting control provided by the iOS system to generate corresponding pictures as video materials;

S312: merge, according to a preset animation effect requirement, the video materials to obtain each frame picture (CALayer), convert the each frame picture into a video frame (CVPixelBuffer), and combine each frame to obtain a video; and S313: merge the downloaded audio of the target song and the video generated through the materials by using the iOS system API to obtain a video file and output the video file.

In an embodiment, for the Android operating system of Google incorporation, the method for video production may be implemented through the system API provided by Android, and the implementation process is as follows:

S321: acquire information of a song list through a network interface and download an audio file of a target song in the song list; use a picture generation control and a text typesetting control provided by the Android system to generate corresponding pictures as video materials;

S322: after assembling element controls of the video materials according to animation parameters in the XML layout, use Canvas to generate Bitmap of each frame of a video, where the Bitmap represents an image through a pixel array;

S323: perform rendering by using the Bitmap as a vein of OpenGL;

S324: transmit data of OpenGL to a video control of the Android system to generate the video;

S325: merge the downloaded audio of the target song and the video generated through the materials by using the Android system API to obtain a video file and output the video file; and S326: share the video file to a corresponding social platform through a sharing SDK provided by a third party.

Further, after S313 and S326, it is also possible to share the video file to a social platform designated by the user through the sharing SDK provided by the third party, or it is also possible to store the video file, such as store the video file locally at the terminal or upload the video file to a cloud database.

In an embodiment of the present disclosure, the user may also set the animation effect and/or the target song by himself, as follows.

Figure 4:
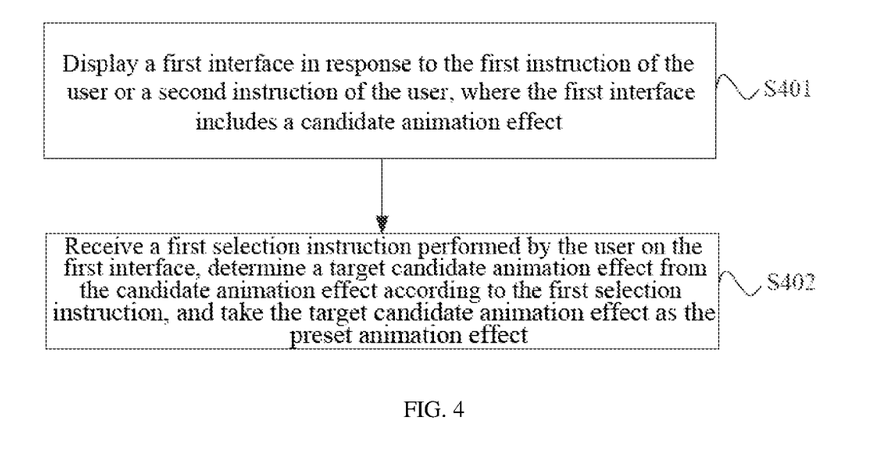
FIG. 4 is a schematic flowchart of a method for video production according to another embodiment of the present disclosure.

In an embodiment of the present disclosure, as shown in FIG. 4, the method may further include:

S401: display a first interface in response to the first instruction of the user or a second instruction of the user, where the first interface includes a candidate animation effect; and S402: receive a first selection instruction performed by the user on the first interface, determine a target candidate animation effect from the candidate animation effect according to the first selection instruction, and take the target candidate animation effect as the preset animation effect.

In the embodiment, the terminal may provide the first interface for setting an animation effect, and the user may set the required animation effect by himself in the first interface. In an implementation, the first interface may include a variety of candidate animation effects. For example, for a certain video material, pre-configure the candidate animation effect when it disappears as, e.g., scaling (zooming), fading out, gradient, etc. The user may input the first selection instruction in the first interface, and the terminal may determine the target candidate animation effect selected by the user according to the first selection instruction. Regarding the triggering of the first interface, it is possible to display the first interface upon the receiving of the first instruction of the user in the above embodiment by the terminal, that is, display the first interface after the user clicks the button for video production or the sharing button in the displaying interface of the song list, or after the user inputs the first instruction to the terminal by way of voices, gestures, etc.; of course, the user may also trigger the displaying of the first interface through other ways (such as the second instruction). For example, the terminal may also be provided with a button for setting an animation effect, after the user clicks the button for setting the animation effect, the terminal may display the first interface after receiving the second instruction of the user clicking the button.

Figure 5:
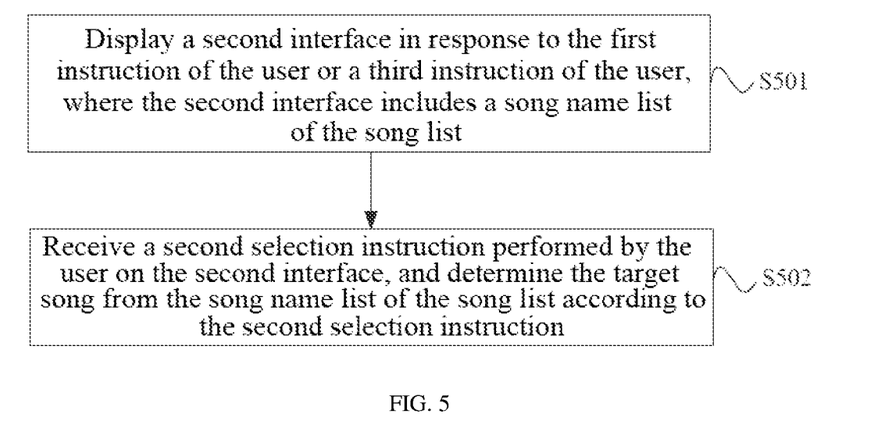
FIG. 5 is a schematic flowchart of a method for video production according to another embodiment of the present disclosure.

In an embodiment of the present disclosure, as shown in FIG. 5, the method may further include:

S501: display a second interface in response to the first instruction of the user or a third instruction of the user, where the second interface includes a song name list of the song list; and S502: receive a second selection instruction performed by the user on the second interface, and determine the target song from the song name list of the song list according to the second selection instruction.

In the embodiment, the terminal may provide the second interface for selecting a song, and the user may select the target song as the background music of the video file on the second interface. Where the second interface may include the song name list of candidate songs in the song list, the user may input the second selection instruction in the second interface, and the terminal may determine the target song selected by the user according to the second selection instruction. Similarly, regarding triggering of the second interface, it is possible to display the second interface upon the receiving of the first instruction of the user in the above embodiment by the terminal, that is, display the second interface after the user clicks the button for video production or the sharing button in the displaying interface of the song list, or after the user inputs the first instruction to the terminal by way of voices, gestures, etc.; of course, the user may also trigger the displaying of the second interface through other ways (such as the second instruction). For example, the terminal may also be provided with a button for selecting a song. After the user clicks the button for selecting the song, the terminal may display the second interface after receiving the second instruction of the user clicking the button.

On the basis of the above embodiments, an embodiment of the present disclosure also provides a solution for the user to set the animation effect by himself to select the target song.

Figure 6A:
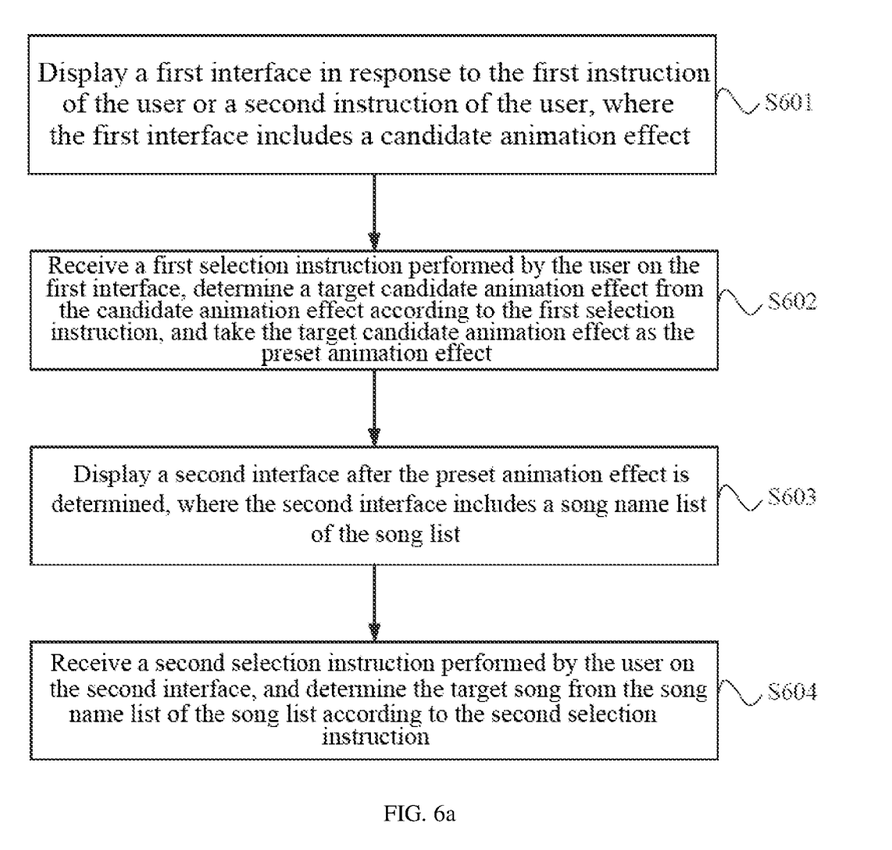
FIG. 6a is a schematic flowchart of setting a preset animation effect and a target song in a method for video production according to another embodiment of the present disclosure.

In an embodiment, as shown in FIG. 6a, a process of setting the animation effect and selecting a target song is as follows:

S601: display a first interface in response to the first instruction of the user or a second instruction of the user, where the first interface includes a candidate animation effect;

S602: receive a first selection instruction performed by the user on the first interface, determine a target candidate animation effect from the candidate animation effect according to the first selection instruction, and take the target candidate animation effect as the preset animation effect;

S603: display a second interface after the preset animation effect is determined, where the second interface includes a song name list of the song list; and S604: receive a second selection instruction performed by the user on the second interface, and determine the target song from the song name list of the song list according to the second selection instruction.

In the embodiment, the user may first trigger the first interface through the first instruction or the second instruction, then determine the target candidate animation effect on the first interface through the first selection instruction as the preset animation effect, trigger displaying of the second interface after the preset animation effect is determined, and then select the target song on the second interface through the second selection instruction.

Figure 6B:
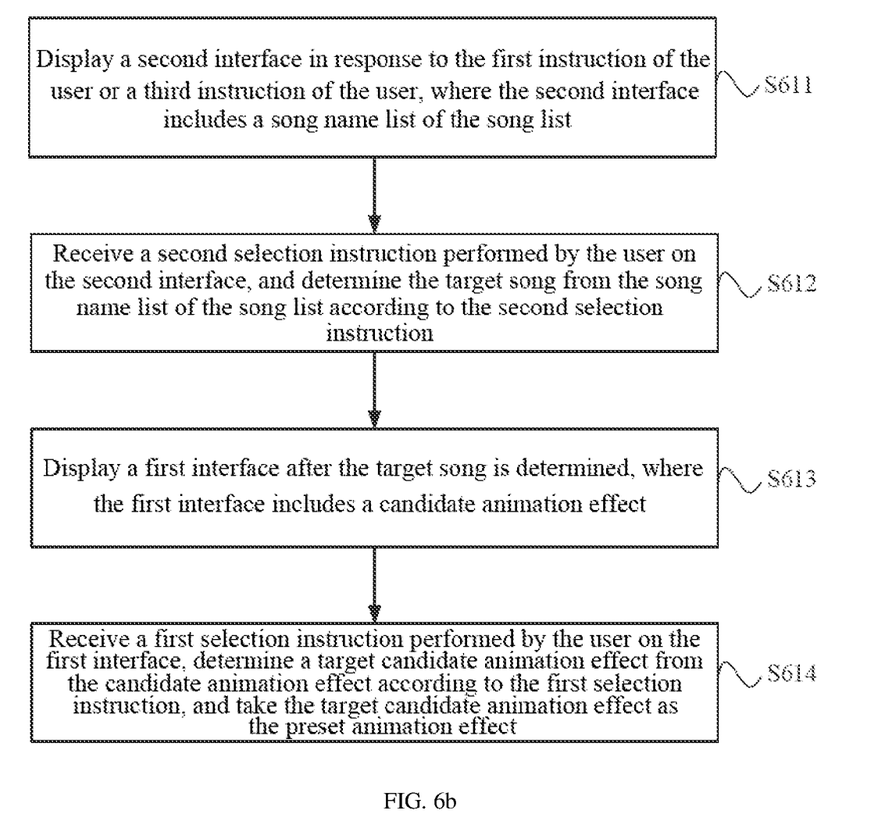
FIG. 6b is a schematic flowchart of setting a preset animation effect and a target song in a method for video production according to another embodiment of the present disclosure.

In another embodiment, as shown in FIG. 6B, a process of setting the animation effect and selecting the target song is as follows:

S611: display a second interface in response to the first instruction of the user or a third instruction of the user, where the second interface includes a song name list of the song list;

S612: receive a second selection instruction performed by the user on the second interface, and determine the target song from the song name list of the song list according to the second selection instruction;

S613: display a first interface after the target song is determined, where the first interface includes a candidate animation effect; and S614: receive a first selection instruction performed by the user on the first interface, determine a target candidate animation effect from the candidate animation effect according to the first selection instruction, and take the target candidate animation effect as the preset animation effect.

In the embodiment, the user may first trigger the second interface through the first instruction or the third instruction, then select the target song on the second interface through the second selection instruction, trigger the displaying of the first interface after the target song is determined, and then determine the target candidate animation effect on the first interface through the first selection instruction as the preset animation effect.

Figure 6C:
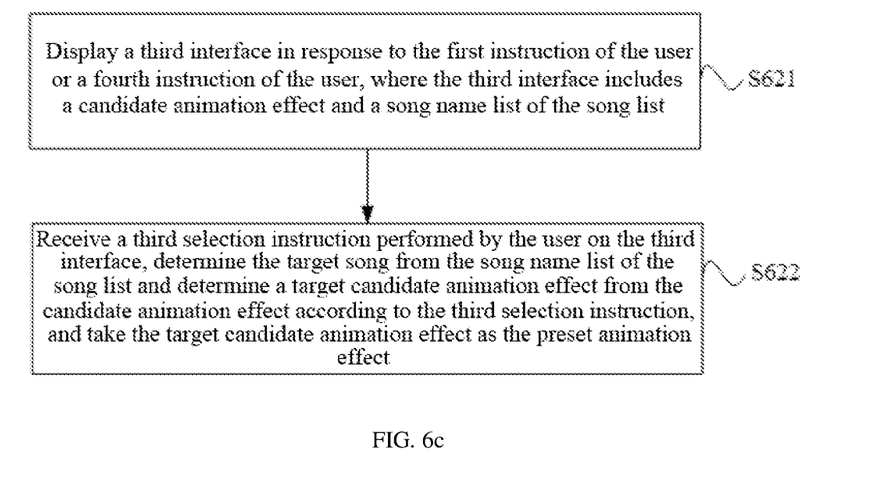
FIG. 6c is a schematic flowchart of setting a preset animation effect and a target song in a method for video production according to another embodiment of the present disclosure.

In another embodiment, as shown in FIG. 6C, a process of setting the animation effect and selecting the target song is as follows:

S621: display a third interface in response to the first instruction of the user or a fourth instruction of the user, where the third interface includes a candidate animation effect and a song name list of the song list; and S622: receive a third selection instruction performed by the user on the third interface, determine the target song from the song name list of the song list and determine a target candidate animation effect from the candidate animation effect according to the third selection instruction, and take the target candidate animation effect as the preset animation effect.

In the embodiment, the terminal may provide the third interface for setting an animation effect and a target song, and the user may set the required animation effect and set the target song as the background music of the video file in the third interface by himself. In an implementation, the third interface may include a variety of candidate animation effects. For example, for a certain video material, pre-configure the candidate animation effects when it disappears as, e.g., zooming, fading out, gradient, etc. The third interface also includes the song name list of candidate songs in the song list, the user may input the third selection instruction in the third interface, the terminal may determine the target candidate animation effect selected by the user according to the third selection instruction and determine the target song from the song name list of the song list. Regarding triggering of the third interface, it is possible to display the third interface upon the receiving of the first instruction of the user in the above embodiment by the terminal, that is, display the third interface after the user clicks the button for video production or the sharing button in the displaying interface of the song list, or after the user inputs the first instruction to the terminal by way of voices, gestures, etc.; of course, the user may also trigger the displaying of the third interface through other ways (such as the fourth instruction). For example, the terminal may also be provided with a setting button, after the user clicks the setting button, the terminal may display the third interface after receiving the fourth instruction of the user clicking the button.

Figure 7:
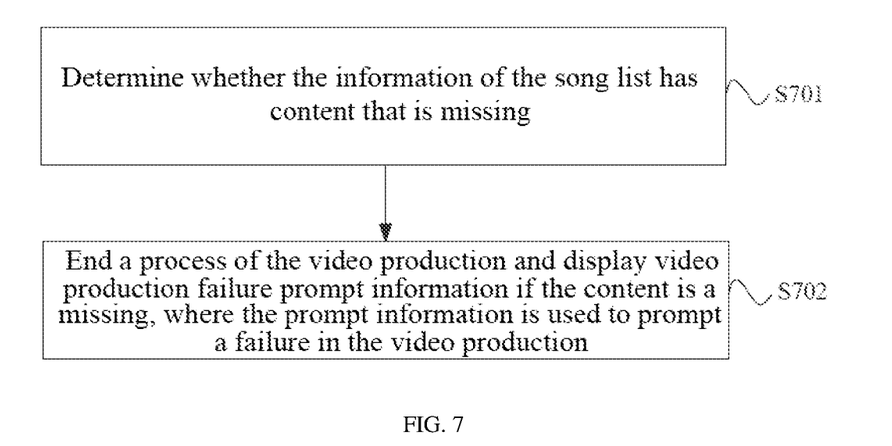
FIG. 7 is a schematic flowchart of a method for video production according to another embodiment of the present disclosure.

In an embodiment of the present disclosure, as shown in FIG. 7, after acquiring the information of the song list in S201, it may also include:

S701: determine whether the information of the song list has content that is missing; and S702: end a process of the video production and display video production failure prompt information if the content is a missing, where the prompt information is used to prompt a failure in the video production.

In the embodiment, since video materials required to generate a video file are indispensable, the information of the song list acquired in S201 needs to be complete and without missing. Therefore, after the information of the song list is acquired, it is possible to check the integrity of the information of the song list, so as to determine whether the acquired information of the song list has any content that is missing. If the content is missing, the subsequent S202-204 will not be executed to avoid a failure of video generation, display the prompt information indicating a failure in the video production on the interface of the terminal to notify the user of the failure in the video production. In an implementation, it is also possible to display which information of the song list is missing; further in an implementation, it is also possible to display a supplement interface for the information of the song list in the interface, where the supplement interface may provide the user with a way to supplement the information of the song list, and the user may supplement the missing information of the song list through this interface.

Of course, usually, the information of the song list is complete and is stored on the server. If the information of the song list acquired by the terminal has content that is missing, it is likely due to a poor network environment. Even if the video can be generated, a subsequent process of sharing the video file to the social platform may fail. Therefore, after prompting the failure in the video production, monitor the network environment. When the network environment reaches a certain standard, generate a prompt for the user on the terminal interface, showing that the song list can be shared again, at this time, it is possible to acquire complete information of the song list and the target song in the song list successfully, and proceed with the subsequent S202-S204.

Figure 8:
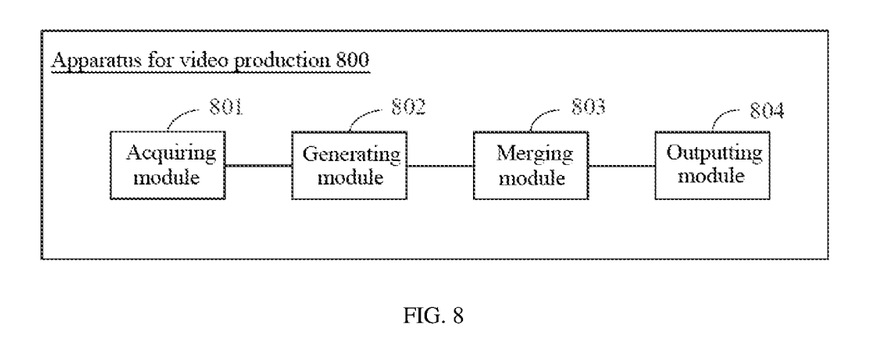
FIG. 8 is a structural block diagram of an apparatus for video production according to an embodiment of the present disclosure.

Corresponding to the method for video production in the above embodiments, FIG. 8 is a structural block diagram of an apparatus for video production according to an embodiment of the present disclosure. For the sake of convenient illustration, only parts related to the embodiments of the present disclosure are shown. Refer to FIG. 8, the apparatus for video production 800 includes an acquiring module 801, a generating module 802, and a merging module 803.

Where the acquiring module 801 is configured to acquire information of a song list and a target song in the song list, in response to a first instruction of a user;
 the generating module 802 is configured to generate video materials according to the information of the song list, and generate a video according to the video materials and a preset animation effect; and
 the merging module 803 is configured to merge the target song and the video to obtain a video file.

In an embodiment of the present disclosure, when generating the video materials according to the information of the song list and generates the video according to the video materials and the preset animation effects, the generating module 802 is configured to:
 determine attribute information and/or action information of each of the video materials according to the preset animation effect;
 perform corresponding processing on the video materials to generate continuous video frames, according to the attribute information and/or the action information of each of the video materials; and
 merge the video frames into the video.

In an embodiment of the present disclosure, the attribute information of the video material includes a size and/or position information of the video material;
 the action information of the video material includes time information and/or an action type of an action performed by the video material.

In an embodiment of the present disclosure, the acquiring module 801 is further configured to:
 display a first interface in response to the first instruction of the user or a second instruction of the user, where the first interface includes a candidate animation effect; and
 receive a first selection instruction performed by the user on the first interface, determine a target candidate animation effect from the candidate animation effect according to the first selection instruction, and take the target candidate animation effect as the preset animation effect.

In an embodiment of the present disclosure, the acquiring module 801 is further configured to:
 display a second interface in response to the first instruction of the user or a third instruction of the user, where the second interface includes a song name list of the song list; and
 receive a second selection instruction performed by the user on the second interface, and determine the target song from the song name list of the song list according to the second selection instruction.

In an embodiment of the present disclosure, the acquiring module 801 is further configured to:
 display a first interface in response to the first instruction of the user or a second instruction of the user, where the first interface includes a candidate animation effect;
 receive a first selection instruction performed by the user on the first interface, determine a target candidate animation effect from the candidate animation effect according to the first selection instruction, and take the target candidate animation effect as the preset animation effect;
 display a second interface after the preset animation effect is determined, where the second interface includes a song name list of the song list; and
 receive a second selection instruction performed by the user on the second interface, and determine the target song from the song name list of the song list according to the second selection instruction.

In an embodiment of the present disclosure, the acquiring module 801 is further configured to:
 display a second interface in response to the first instruction of the user or a third instruction of the user, where the second interface includes a song name list of the song list;
 receive a second selection instruction performed by the user on the second interface, and determine the target song from the song name list of the song list according to the second selection instruction;
 display a first interface after the target song is determined, where the first interface includes a candidate animation effect; and
 receive a first selection instruction performed by the user on the first interface, determine a target candidate animation effect from the candidate animation effect according to the first selection instruction, and take the target candidate animation effect as the preset animation effect.

In an embodiment of the present disclosure, the acquiring module 801 is further configured to:
 display a third interface in response to the first instruction of the user or a fourth instruction of the user, where the third interface includes a candidate animation effect and a song name list of the song list;
 receive a third selection instruction performed by the user on the third interface, determine the target song from the song name list of the song list and determine a target candidate animation effect from the candidate animation effect according to the third selection instruction, and take the target candidate animation effect as the preset animation effect.

In an embodiment of the present disclosure, the information of the song list includes at least one of the following items:

a cover image of the song list, a name of the song list, a song name list, information on an author of the song list, information on a sharer, information on an artist of a song.

In an embodiment of the present disclosure, after the acquiring the information of the song list, the acquiring module 801 is further configured to:

determine whether the information of the song list has content that is missing; and end a process of the video production and display video production failure prompt information if the content is a missing, where the prompt information is used to prompt a failure in the video production.

In an embodiment of the present disclosure, the apparatus further includes an outputting module 804, which is configured to:

share the video file to a target platform after obtaining the video file; and/or store the video file.

The apparatus for video production provided by the embodiment may be used to execute the technical solutions in the above method embodiments, its implementation principle and technical effect are similar, and will not be repeated here in the embodiment.

Figure 9:
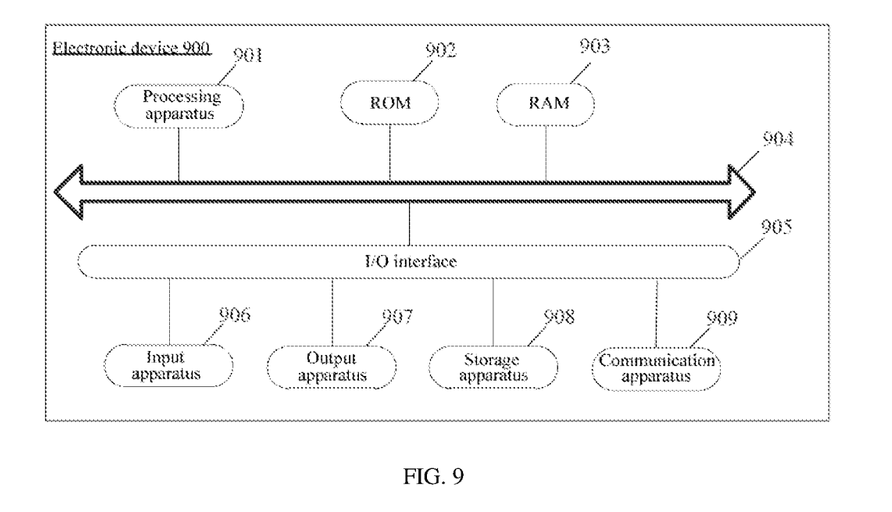
FIG. 9 is a hardware schematic structural diagram of an electronic device according to an embodiment of the present disclosure.

Refer to FIG. 9, which shows a schematic structural diagram of an electronic device 900 suitable for implementing the embodiments of the present disclosure, the electronic device 900 may be a terminal device or a server. Where the terminal device may include, but is not limited to, a mobile terminal, such as a mobile phone, a notebook computer, a digital broadcast receiver, a personal digital assistant (PDA), a portable android device (PAD), a portable multimedia player (PMP), an in-vehicle terminal (for example, an in-vehicle navigation terminal) and the like, and a fixed terminal, such as a digital television (TV), a desktop computer and the like. The electronic device shown in FIG. 9 is only an example, and should not bring any limitation to the function and scope of use of the embodiments of the present disclosure.

As shown in FIG. 9, the electronic device 900 may include a processing apparatus (such as a central processor, a graphics processor, etc.) 901, which may perform various appropriate actions and processing according to a program stored in a read-only memory (ROM) 902 or a program loaded from a storage apparatus 908 to a random access memory (RAM) 903. In the RAM 903, various programs and data required for the operation of the terminal device 900 are also stored. The processing apparatus 901, the ROM 902, and the RAM 903 are connected to each other through a bus 904. An input/output (I/O) interface 905 is also connected to the bus 904.

Generally, the following apparatuses may be connected to the I/O interface 905: an input apparatus 906, including for example a touch screen, a touch panel, a keyboard, a mouse, a camera, a microphone, a accelerometer, a gyroscope, and the like; an output apparatus 907, including for example a liquid crystal display (LCD), a speaker, a vibrator, and the like; a storage apparatus 908, including for example a magnetic tape, a hard disk, and the like; and a communication apparatus 909. The communication apparatus 909 may allow the electronic device 900 to perform wireless or wired communication with other devices to exchange data. Although FIG. 9 shows the electronic device 900 with multiple kinds of apparatuses, it is not required to implement or have all the apparatuses shown in FIG. 9. It may alternatively be implemented or provided with more or fewer apparatuses.

In particular, according to an embodiment of the present disclosure, the process described above with reference to the flowchart may be implemented as a computer software program. For example, an embodiment of the present disclosure includes a computer program product, which includes a computer program carried on a computer readable medium, and the computer program contains program codes for executing the method shown in the flowchart. In such an embodiment, the computer program may be downloaded from a network and installed through the communication apparatus 909, or installed from the storage apparatus 908, or installed from the ROM 902. When the computer program is executed by the processing apparatus 901, the above-mentioned functions defined in the method of the embodiment of the present disclosure are executed.

It should be noted that, the above-mentioned computer readable medium in the present disclosure may be a computer readable signal medium or a computer readable storage medium or any combination of the both. The computer readable storage medium may be, for example, but not limited to, an electrical, magnetic, optical, electromagnetic, infrared, or semiconductor system, apparatus or device, or any combination of the above. More specific examples of the computer readable storage medium may include, but are not limited to: an electrical connection with one or more wires, a portable computer disk, a hard disk, a random access memory (RAM), a read only memory (ROM), an erasable programmable read-only memory (EPROM), or flash memory), an optical fiber, a compact disc read-only memory (CD-ROM), an optical storage device, a magnetic storage device, or any suitable combination of the above. In the present disclosure, the computer readable storage medium may be any tangible medium that contains or stores a program, and the program may be used by or in combination with an instruction execution system, apparatus, or device. In the present disclosure, a computer readable signal medium may include a data signal propagated in a baseband or propagated as a part of a carrier wave, and a computer readable program code is carried therein. This propagated data signal may adopt many forms, including but not limited to, an electromagnetic signal, an optical signal, or any suitable combination of the above. The computer readable signal medium may also be any computer readable medium other than the computer readable storage medium, the computer readable signal medium may send, propagate, or transmit the program used by or in combination with the instruction execution system, apparatus, or device. The program code contained on the computer readable medium may be transmitted by any suitable medium, including but not limited to: a wire, an optical cable, a radio frequency (RF), etc., or any suitable combination of the above.

The above-mentioned computer readable medium may be included in the above-mentioned terminal device; or it may exist alone without being assembled into the electronic device.

The above-mentioned computer readable medium carries one or more programs, and when the above-mentioned one or more programs are executed by the electronic device, the electronic device is caused to execute the method shown in the above-mentioned embodiments.

The computer program code used to perform operations of the present disclosure may be written in one or more programming languages or a combination thereof. The above-mentioned programming languages include an object-oriented programming language—such as Java, Smalltalk, C++, and also include a conventional procedural programming language—such as "C" language or similar programming language. The program code may be executed entirely on a computer of a user, partly on a computer of a user, executed as an independent software package, partly executed on a computer of a user and partly executed on a remote computer, or entirely executed on a remote computer or server. In a case where a remote computer is involved, the remote computer may be connected to the computer of the user through any kind of network—including a local area network (LAN) or a wide area network (WAN), or, it may be connected to an external computer (for example, connected via the Internet through an Internet service provider).

The flowcharts and block diagrams in the accompanying drawings illustrate possible implementation architecture, functions, and operations of the system, method, and computer program product according to the embodiments of the present disclosure. In this point, each block in the flowchart or block diagram may represent a module, a program segment, or a part of code, and the module, the program segment, or the part of code contains one or more executable instructions for implementing a designated logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that, each block in the block diagram and/or flowchart, and a combination of the blocks in the block diagram and/or flowchart, may be implemented by a dedicated hardware-based system that performs designated functions or operations, or may be implemented by a combination of dedicated hardware and computer instructions.

The units involved in the embodiments of the present disclosure may be implemented in software or hardware. Where a name of a unit does not constitute a limitation on the unit itself in one case. For example, a first acquiring unit may also be described as "a unit that acquires at least two Internet Protocol addresses".

The functions described above may be performed at least in part by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD), etc.

In a first aspect, an embodiment of the present disclosure provides a method for video production, including:
  in response to a first instruction of a user acquiring information of a song list and a target song in the song list;
  generating video materials according to the information of the song list, and generating a video according to the video materials and a preset animation effect; and
  merging the target song and the video to obtain a video file.

According to one or more embodiments of the present disclosure, the generating the video materials according to the information of the song list, and generating the video according to the video materials and the preset animation effect, including:
  determining attribute information and/or action information of each of the video materials according to the preset animation effect;
  performing corresponding processing on the video material to generate continuous video frames, according to the attribute information and/or the action information of each of the video materials; and
  merging the video frames into the video.

According to one or more embodiments of the present disclosure, the attribute information of the video material includes a size and/or position information of the video material;
  the action information of the video material includes time information and/or an action type of an action performed by the video material.

According to one or more embodiments of the present disclosure, the method further includes:
  displaying a first interface in response to the first instruction of the user or a second instruction of the user, where the first interface includes a candidate animation effect; and
  receiving a first selection instruction performed by the user on the first interface, determining a target candidate animation effect from the candidate animation effect according to the first selection instruction, and taking the target candidate animation effect as the preset animation effect.

According to one or more embodiments of the present disclosure, the method further includes:
  displaying a second interface in response to the first instruction of the user or a third instruction of the user, where the second interface includes a song name list of the song list; and
  receiving a second selection instruction performed by the user on the second interface, and determining the target song from the song name list of the song list according to the second selection instruction.

According to one or more embodiments of the present disclosure, the method further includes:
  displaying a first interface in response to the first instruction of the user or a second instruction of the user, where the first interface includes a candidate animation effect;
  receiving a first selection instruction performed by the user on the first interface, determining a target candidate animation effect from the candidate animation effect according to the first selection instruction, and taking the target candidate animation effect as the preset animation effect;
  displaying a second interface after the preset animation effect is determined, where the second interface includes a song name list of the song list; and
  receiving a second selection instruction performed by the user on the second interface, and determining the target song from the song name list of the song list according to the second selection instruction.

According to one or more embodiments of the present disclosure, the method further includes:
  displaying a second interface in response to the first instruction of the user or a third instruction of the user, where the second interface includes a song name list of the song list;
  receiving a second selection instruction performed by the user on the second interface, and determining the target song from the song name list of the song list according to the second selection instruction;
  displaying a first interface after the target song is determined, where the first interface includes a candidate animation effect; and
  receiving a first selection instruction performed by the user on the first interface, determining a target candidate animation effect from the candidate animation effect according to the first selection instruction, and taking the target candidate animation effect as the preset animation effect.

According to one or more embodiments of the present disclosure, the method further includes:
displaying a third interface in response to the first instruction of the user or a fourth instruction of the user, where the third interface includes a candidate animation effect and a song name list of the song list; and
receiving a third selection instruction performed by the user on the third interface, determining the target song from the song name list of the song list and determining a target candidate animation effect from the candidate animation effect according to the third selection instruction, and taking the target candidate animation effect as the preset animation effect.

According to one or more embodiments of the present disclosure, the information of the song list includes at least one of the following items:
a cover image of the song list, a name of the song list, a song name list, information on an author of the song list, information on a sharer, information on an artist of a song.

According to one or more embodiments of the present disclosure, after the acquiring the information of the song list, further including:
determining whether the information of the song list has content that is missing; and
ending a process of the video production and displaying video production failure prompt information if the content is a missing, where the prompt information is used to prompt a failure in the video production.

According to one or more embodiments of the present disclosure, after the obtaining the video file, further including:
sharing the video file to a target platform; and/or
storing the video file.

In a second aspect, an embodiment of the present disclosure provides an apparatus for video production, including:
an acquiring module, configured to acquire information of a song list and a target song in the song list, in response to a first instruction of a user;
a generating module, configured to generate video materials according to the information of the song list, and generate a video according to the video materials and a preset animation effect; and
a merging module, configured to merge the target song and the video to obtain a video file.

According to one or more embodiments of the present disclosure, when generating the video materials according to the information of the song list, and generates the video according to the video materials and the preset animation effect, the generating module is configured to:
determine attribute information and/or action information of each of the video materials according to the preset animation effect;
perform corresponding processing on the video material to generate continuous video frames, according to the attribute information and/or the action information of each of the video materials; and
merge the video frames into the video.

According to one or more embodiments of the present disclosure, the attribute information of the video material includes a size and/or position information of the video material;

the action information of the video material includes time information and/or an action type of an action performed by the video material.

According to one or more embodiments of the present disclosure, the acquiring module is further configured to:
display a first interface in response to the first instruction of the user or a second instruction of the user, where the first interface includes a candidate animation effect; and
receive a first selection instruction performed by the user on the first interface, determine a target candidate animation effect from the candidate animation effect according to the first selection instruction, and take the target candidate animation effect as the preset animation effect.

According to one or more embodiments of the present disclosure, the acquiring module is further configured to:
display a second interface in response to the first instruction of the user or a third instruction of the user, where the second interface includes a song name list of the song list; and
receive a second selection instruction performed by the user on the second interface, and determine the target song from the song name list of the song list according to the second selection instruction.

According to one or more embodiments of the present disclosure, the acquiring module is further configured to:
display a first interface in response to the first instruction of the user or a second instruction of the user, where the first interface includes a candidate animation effect;
receive a first selection instruction performed by the user on the first interface, determine a target candidate animation effect from the candidate animation effect according to the first selection instruction, and take the target candidate animation effect as the preset animation effect;
display a second interface after the preset animation effect is determined, where the second interface includes a song name list of the song list; and
receive a second selection instruction performed by the user on the second interface, and determine the target song from the song name list of the song list according to the second selection instruction.

According to one or more embodiments of the present disclosure, the acquiring module is further configured to:
display a second interface in response to the first instruction of the user or a third instruction of the user, where the second interface includes a song name list of the song list;
receive a second selection instruction performed by the user on the second interface, and determine the target song from the song name list of the song list according to the second selection instruction;
display a first interface after the target song is determined, where the first interface includes a candidate animation effect; and
receive a first selection instruction performed by the user on the first interface, determine a target candidate animation effect from the candidate animation effect according to the first selection instruction, and take the target candidate animation effect as the preset animation effect.

According to one or more embodiments of the present disclosure, the acquiring module is further configured to:
display a third interface in response to the first instruction of the user or a fourth instruction of the user, where the third interface includes a candidate animation effect and a song name list of the song list; and receive a third selection instruction performed by the user on the third interface, determine the target song from the song name list of the song list and determine a target candidate animation effect from the candidate animation effect according to the third selection instruction, and take the target candidate animation effect as the preset animation effect.

According to one or more embodiments of the present disclosure, the information of the song list includes at least one of the following items:

a cover image of the song list, a name of the song list, a song name list, information on an author of the song list, information on a sharer, information on an artist of a song.

According to one or more embodiments of the present disclosure, after the acquiring the information of the song list, the acquiring module is further configured to:

determine whether the information of the song list has content that is missing; and end a process of the video production and display video production failure prompt information if the content is a missing, and the prompt information is used to prompt a failure in the video production.

According to one or more embodiments of the present disclosure, the apparatus further includes an outputting module which is configured to:

share the video file to a target platform after obtaining the video file; and/or store the video file.

In a third aspect, an embodiment of the present disclosure provides an electronic device, including at least on processor and a memory;

the memory stores a computer executable instruction;

the at least one processor executes a computer executable instruction stored in the memory, and causes the at least one processor to execute the method in the above-mentioned first aspect.

In a fourth aspect, an embodiment of the present disclosure provides a computer readable storage medium having a computer executable instruction stored thereon, when a processor executes the computer executable instruction, the method in the above-mentioned first aspect is implemented.

In a fifth aspect, an embodiment of the present disclosure provides a computer program product, the computer program product includes a computer program, the computer program is stored in a computer readable storage medium, at least one processor of an electronic device may read the computer program from the computer readable storage medium, when the processor executes the computer program, the method in the above-mentioned first aspect is implemented.

In a sixth aspect, an embodiment of the present disclosure provides a computer program, the computer program is stored in a computer readable storage medium, at least one processor of a device may read the computer program from the computer readable storage medium, and when the processor executes the computer program, the method in the above-mentioned first aspect is implemented.

The above description is only preferred embodiments of the present disclosure and an illustration of the applied technical principles. Those skilled in the art should understand that, the disclosure scope involved in the present disclosure is not limited to the technical solutions formed by the specific combination of the above technical features, but also covers other technical solutions formed by the arbitrary combination of the above technical features or their equivalent features without departing from the above disclosure concept, for example, a technical solution formed by replacing the above features with technical features with similar functions disclosed (but not limited to) in the present disclosure.

In addition, although each operation is described in a specific order, this should not be understood as requiring these operations to be performed in the specific order or in a sequential order shown. Under certain circumstances, multitasking and parallel processing may be advantageous. Similarly, although several specific implementation details are included in the above discussion, these should not be interpreted as limiting the scope of the present disclosure. Certain features described in the context of a single embodiment may also be implemented in combination in the single embodiment. Conversely, various features described in the context of a single embodiment may also be implemented in multiple embodiments individually or in any suitable sub combination.

Although the subject matter has been described in language specific to structural features and/or method logical actions, it should be understood that the subject matter defined in the appended claims is not limited to the specific features or actions described above. On the contrary, the specific features and actions described above are only exemplary forms for implementing the claims.

What is claimed is:

1. A method for generating a video, comprising:
   in response to a first instruction of a user, acquiring information of a song list and a target song in the song list, wherein the information of the song list comprises a picture;
   generating video materials according to the information of the song list, and generating the video according to the video materials and a preset animation effect, wherein at least one of attribute information and action information of each of the video materials is determined according to the preset animation effect; and
   merging the target song and the video to obtain a video file for displaying the information of the song list.

2. The method according to claim 1, wherein generating the video materials according to the information of the song list, and generating the video according to the video materials and the preset animation effect comprises:
   determining at least one of the attribute information and the action information of each of the video materials according to the preset animation effect;
   performing corresponding processing on the video materials to generate continuous video frames, according to at least one of the attribute information and/or and the action information of each of the video materials; and
   merging the video frames into the video.

3. The method according to claim 2, wherein the attribute information of the video materials comprises at least one of a size and position information of the video materials; and
   the action information of the video materials comprises at least one of time information and an action type of an action performed by the video materials.

4. The method according to claim 1, further comprising:
   displaying a first interface in response to the first instruction of the user or a second instruction of the user, wherein the first interface comprises a candidate animation effect; and
   receiving a first selection instruction performed by the user on the first interface, determining a target candidate animation effect from the candidate animation effect according to the first selection instruction, and taking the target candidate animation effect as the preset animation effect.

5. The method according to claim 1, further comprising:
displaying a second interface in response to the first instruction of the user or a third instruction of the user, wherein the second interface comprises a song name list of the song list; and
receiving a second selection instruction performed by the user on the second interface, and determining the target song from the song name list of the song list according to the second selection instruction.

6. The method according to claim 1, further comprising:
displaying a first interface in response to the first instruction of the user or a second instruction of the user, wherein the first interface comprises a candidate animation effect;
receiving a first selection instruction performed by the user on the first interface, determining a target candidate animation effect from the candidate animation effect according to the first selection instruction, and taking the target candidate animation effect as the preset animation effect;
displaying a second interface after the preset animation effect is determined, wherein the second interface comprises a song name list of the song list; and
receiving a second selection instruction performed by the user on the second interface, and determining the target song from the song name list of the song list according to the second selection instruction.

7. The method according to claim 1, further comprising:
displaying a second interface in response to the first instruction of the user or a third instruction of the user, wherein the second interface comprises a song name list of the song list;
receiving a second selection instruction performed by the user on the second interface, and determining the target song from the song name list of the song list according to the second selection instruction;
displaying a first interface after the target song is determined, wherein the first interface comprises a candidate animation effect; and
receiving a first selection instruction performed by the user on the first interface, determining a target candidate animation effect from the candidate animation effect according to the first selection instruction, and taking the target candidate animation effect as the preset animation effect.

8. The method according to claim 1, further comprising:
displaying a third interface in response to the first instruction of the user or a fourth instruction of the user, wherein the third interface comprises a candidate animation effect and a song name list of the song list; and
receiving a third selection instruction performed by the user on the third interface, determining the target song from the song name list of the song list and determining a target candidate animation effect from the candidate animation effect according to the third selection instruction, and taking the target candidate animation effect as the preset animation effect.

9. The method according to claim 1, wherein the information of the song list comprises a cover image of the song list and at least one of:
a name of the song list, a song name list, information on an author of the song list, information on a sharer, and information on an artist of a song.

10. The method according to claim 1, after the acquiring the information of the song list, further comprising:
determining whether the information of the song list has content that is missing; and
ending a process of generating the video and displaying prompt information if the content is a missing, wherein the prompt information is used to prompt a failure in the generating the video.

11. The method according to claim 1, after the obtaining the video file, further comprising at least one of:
sharing the video file to a target platform; and
storing the video file.

12. An apparatus for generating a video, the apparatus comprising:
at least one processor; and
a memory storing computer-executable instructions, which when executed by the at least one processor, configures the at least one processor to:
acquire information of a song list and a target song in the song list, in response to a first instruction of a user, wherein the information of the song list comprises a picture;
generate video materials according to the information of the song list, and generate the video according to the video materials and a preset animation effect, wherein at least one of attribute information and action information of each of the video materials is determined according to the preset animation effect; and
merge the target song and the video to obtain a video file for displaying the information of the song list.

13. The apparatus according to claim 12, wherein to generate the video materials according to the information of the song list and generate the video according to the video materials and the preset animation effect, the at least one processor is configured to:
determine at least one of the attribute information and the action information of each of the video materials according to the preset animation effect;
perform corresponding processing on the video materials to generate continuous video frames, according to at least one of the attribute information and the action information of each of the video materials; and
merge the video frames into the video.

14. The apparatus according to claim 13, wherein the attribute information of the video materials comprises at least one of a size and position information of the video materials; and
the action information of the video materials comprises at least one of time information and an action type of an action performed by the video materials.

15. The apparatus according to claim 12, wherein the at least one processor is further configured to:
display a first interface in response to the first instruction of the user or a second instruction of the user, wherein the first interface comprises a candidate animation effect; and
receive a first selection instruction performed by the user on the first interface, determine a target candidate animation effect from the candidate animation effect according to the first selection instruction, and take the target candidate animation effect as the preset animation effect.

16. The apparatus according to claim 12, wherein the at least one processor is further configured to:
display a first interface in response to the first instruction of the user or a second instruction of the user, wherein the first interface comprises a song name list of the song list; and receive a first selection instruction performed by the user on the first interface, and determine the target song from the song name list of the song list according to the first selection instruction.

17. The apparatus according to claim 12, wherein the at least one processor is further configured to:
    display a first interface in response to the first instruction of the user or a second instruction of the user, wherein the first interface comprises a candidate animation effect;
    receive a first selection instruction performed by the user on the first interface, determine a target candidate animation effect from the candidate animation effect according to the first selection instruction, and take the target candidate animation effect as the preset animation effect;
    display a second interface after the preset animation effect is determined, wherein the second interface comprises a song name list of the song list; and
    receive a second selection instruction performed by the user on the second interface, and determine the target song from the song name list of the song list according to the second selection instruction.

18. The apparatus according to claim 12, wherein the at least one processor is further configured to:
    display a first interface in response to the first instruction of the user or a second instruction of the user, wherein the first interface comprises a song name list of the song list;
    receive a first selection instruction performed by the user on the first interface, and determine the target song from the song name list of the song list according to the first selection instruction;
    display a second interface after the target song is determined, wherein the second interface comprises a candidate animation effect; and
    receive a second selection instruction performed by the user on the second interface, determine a target candidate animation effect from the candidate animation effect according to the second selection instruction, and take the target candidate animation effect as the preset animation effect.

19. A non-transitory computer readable storage medium having one or more computer-executable instructions stored thereon, which when executed by a processor, causes the processor to:
    acquire information of a song list and a target song in the song list in response to a first instruction of a user, wherein the information of the song list comprises a picture;
    generate video materials according to the information of the song list;
    generate a video according to the video materials and a preset animation effect, wherein at least one of attribute information and action information of each of the video materials is determined according to the preset animation effect; and
    merge the target song and the video to obtain a video file for displaying the information of the song list.

20. The method according to claim 1, wherein the generating video materials according to the information of the song list comprises:
    typesetting information of the song list of a text-type and converting the information of the song list of the text-type into a form of pictures to obtain the video materials corresponding to the information of the song list of the text-type; and
    cutting information of the song list of a picture-type to obtain the video materials corresponding to the information of the song list of the picture-type.

* * * * *